(12) United States Patent
Brown et al.

(10) Patent No.: US 8,491,135 B2
(45) Date of Patent: Jul. 23, 2013

(54) INTERACTIVE PROJECTION WITH GESTURE RECOGNITION

(75) Inventors: Margaret K. Brown, Seattle, WA (US); George Thomas Valliath, Winnetka, IL (US); David R. Nash, Arlington, WA (US)

(73) Assignee: Microvision, Inc., Redmond, WA (US)

( * ) Notice: Subject to any disclaimer, the term of this patent is extended or adjusted under 35 U.S.C. 154(b) by 307 days.

(21) Appl. No.: 13/080,556

(22) Filed: Apr. 5, 2011

(65) Prior Publication Data

US 2011/0181553 A1 Jul. 28, 2011

Related U.S. Application Data

(63) Continuation-in-part of application No. 12/651,622, filed on Jan. 4, 2010.

(51) Int. Cl.
*G03B 21/14* (2006.01)
*H03L 7/00* (2006.01)
*H04N 9/74* (2006.01)
*H04N 5/33* (2006.01)
*G02F 1/01* (2006.01)
*G01C 5/00* (2006.01)
*G01B 11/14* (2006.01)

(52) U.S. Cl.
USPC ............. 353/121; 353/122; 353/97; 348/589; 348/590; 348/164; 250/221; 250/330; 250/338.1; 250/339.1; 250/495.1; 356/3.1; 356/602; 356/623

(58) Field of Classification Search
USPC .................... 353/122, 121, 97; 348/586, 590, 348/164; 250/221, 330, 338.1, 339.14, 495.1; 356/3.1, 602, 623
See application file for complete search history.

(56) References Cited

U.S. PATENT DOCUMENTS

| 6,775,014 | B2 | 8/2004 | Foote et al. | |
|---|---|---|---|---|
| 6,863,402 | B2 | 3/2005 | Roddy et al. | |
| 7,144,117 | B2 | 12/2006 | Kojima | |
| 2001/0028341 | A1* | 10/2001 | Kitazawa | 345/156 |
| 2004/0160581 | A1 | 8/2004 | Parker et al. | |
| 2004/0263791 | A1 | 12/2004 | Chen et al. | |
| 2008/0309619 | A1 | 12/2008 | Leung et al. | |
| 2009/0091710 | A1* | 4/2009 | Huebner | 353/28 |

FOREIGN PATENT DOCUMENTS

JP 2001-125736 5/2001
JP 2005-266471 12/2005

OTHER PUBLICATIONS

Microvision, Inc., , "International Search Report and Written Opinion", ISR and Written Opinion for PCT/US2010/061322 Jul. 29, 2011.

* cited by examiner

*Primary Examiner* — Georgia Y Epps
*Assistant Examiner* — Magda Cruz
(74) *Attorney, Agent, or Firm* — Kevin D. Wills

(57) ABSTRACT

An apparatus determines a cursor position in an illumination field of a projector. An obstruction is detected in the illumination field. The cursor position is determined as the point on the obstruction furthest from where the obstruction crosses a border of the illumination field. A distance to the point on the obstruction is determined and compared to a distance to a point not on the obstruction. Gestures are recognized as a function of movement of the obstruction and the determined distances.

31 Claims, 12 Drawing Sheets

INTERACTIVE PROJECTION WITH GESTURE RECOGNITION

RELATED APPLICATIONS

Benefit is claimed under 35 U.S.C. §120 as a Continuation-in-Part (CIP) of U.S. application Ser. No. 12/651,622, entitled "Interactive Projection Method, Apparatus, and System" by Margaret K. Brown, filed Jan. 4, 2010, which is incorporated herein by reference in its entirety for all purposes.

FIELD

The present invention relates generally to interactive displays, and more specifically to interactive projection systems.

BACKGROUND

Projection systems typically project a visible image on a surface. For example, a projection system may project the contents of a computer display on a wall or board.

Interactive projection systems typically include an interactive display surface such as a SMART Board™ available from Smart Technology ULC, Calgary, AB Canada. Interactive display surfaces typically interface with a computer (e.g., via Universal Serial Bus, or "USB") and convert touch and taps to cursor positions and mouse clicks.

Interactive display surfaces have proven to be very popular for fixed installations; however they are not very portable.

DESCRIPTION OF EMBODIMENTS

Figure 1A:
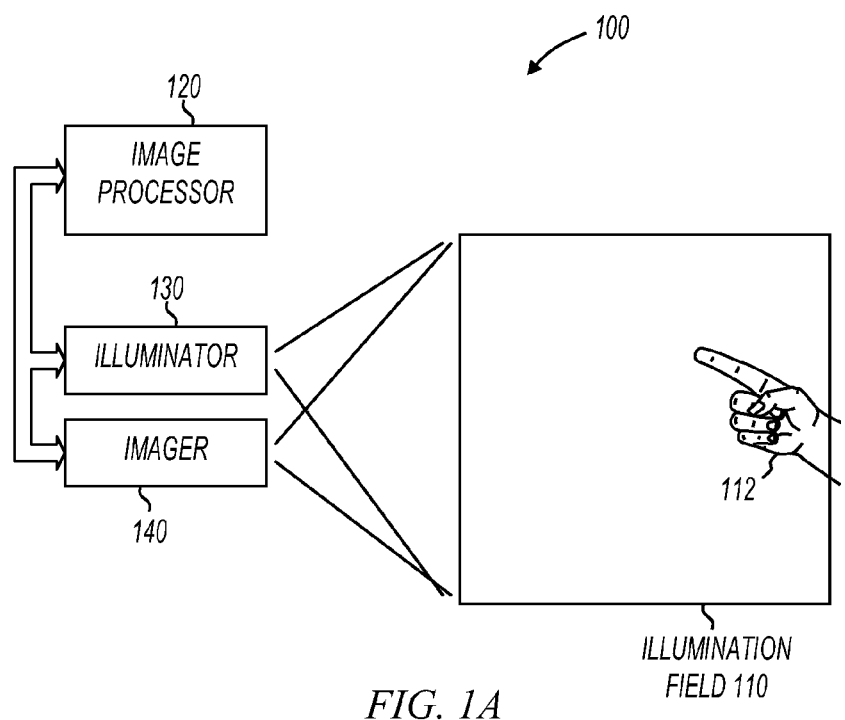
FIGS. 1A-1C show an interactive projection system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1B:
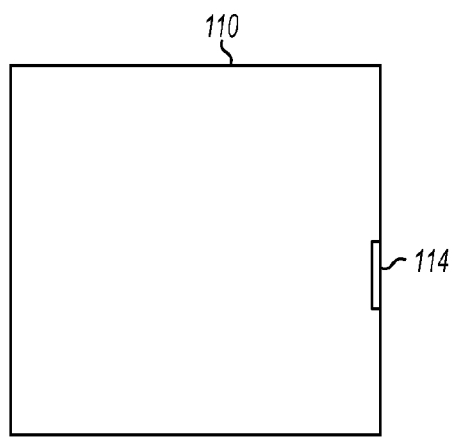
Figure 1C:
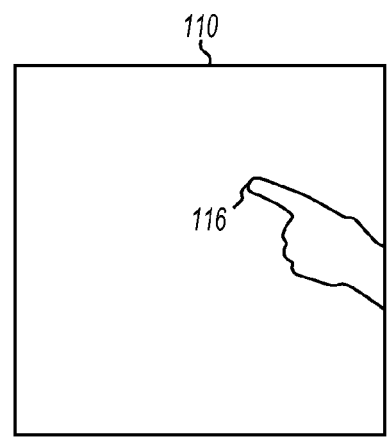

FIGS. 1A-1C show an interactive projection system in accordance with various embodiments of the present invention. System 100 includes illuminator 130, imager 140, and image processor 120. In operation, illuminator 130 projects light in illumination field 110, and imager 140 captures images of illumination field 110. Image processor 120 receives images from imager 140 and detects obstruction 112 in illumination field 110. Image processor 120 determines where obstruction 112 crosses the border of the illumination field 110 (shown at 114 in FIG. 2B), and then determines the point (116, FIG. 2C) on obstruction 112 that is furthest from where the obstruction crosses the boundary. This point 116 is then set as the cursor position.

Illuminator 130 may be any apparatus or component capable of projecting light in to illumination field 110. For example, in some embodiments, illuminator 130 may be a projector that projects visible light. Also for example, in some embodiments, illuminator 130 may be a projector that projects nonvisible light, such as infrared light. Further, in some embodiments, illuminator 130 may be a projector that projects both visible and nonvisible light.

Illuminator 130 may include a reflective or transmissive display panel. For example, in some embodiments, illuminator 130 may include one or more liquid crystal display (LCD) panels, liquid crystal on silicon (LCoS) panels, or digital light processing (DLP®) panels. Further, illuminator 130 may include a scanning projector. For example, in some embodiments, illuminator 130 may include a scanning mirror that reflects laser light to project an image.

Imager 140 may be any apparatus or component that includes one or more light sensors. In some embodiments, imager 140 may be a light detection device that includes an array of photosensitive elements that detect either or both of visible and nonvisible light. For example, imager 140 may be a charge coupled device (CCD) or a CMOS image sensor, and may detect any one or more wavelengths of light.

Image processor 120 may be any apparatus or component that can operate on data received from imager 140. For example, in some embodiments, image processor 120 may be a microprocessor or a digital signal processor. In other embodiments, processor 120 may be a dedicated processor such as a processor included in an application specific integrated circuit (ASIC). Any processing element, including any combination of hardware and/or software may be utilized without departing from the scope of the present invention.

Obstruction 112 is shown as a human hand, although system 100 can detect any type of obstruction. A hand is shown in FIG. 1A to demonstrate that a person can interact with the system by simply pointing with a hand or other object. Various embodiments of the present invention facilitate this interaction by determining a cursor position at the tip of the object (116, FIG. 1C). Various embodiments of the invention also provide further interaction such as mouse clicks, drag, drop, etc. The operation of system 100 is now described with reference to the remaining figures.

Figure 2:
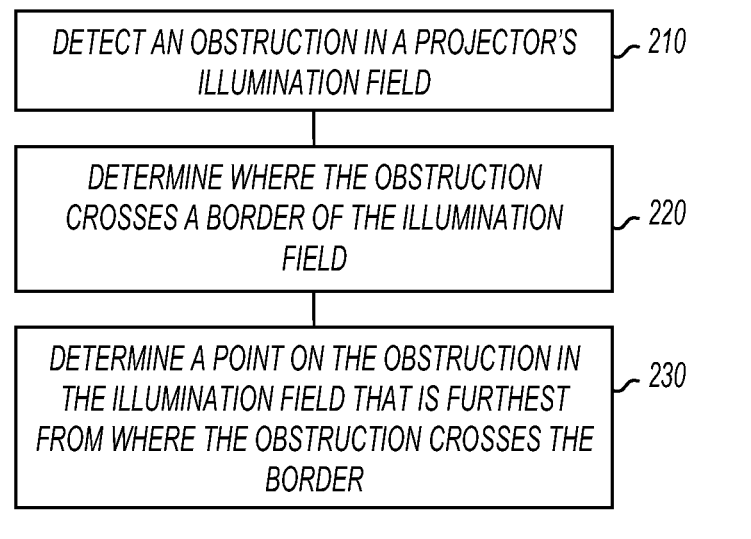
FIGS. 2 and 3 show flowcharts of methods in accordance with various embodiments of the present invention.

FIG. 2 shows a flowchart in accordance with various embodiments of the present invention. In some embodiments, method 200, or portions thereof, is performed by an interactive projection system, embodiments of which are shown in the figures. In other embodiments, method 200 is performed by a series of circuits, a mobile device, or an electronic system. Method 200 is not limited by the particular type of apparatus performing the method. The various actions in method 200 may be performed in the order presented, or may be performed in a different order. Further, in some embodiments, some actions listed in FIG. 2 are omitted from method 200.

Method 200 is shown beginning with block 210 in which an obstruction is detected in a projector's illumination field. This corresponds to system 100 detecting obstruction 112 in illumination field 110 (FIG. 1A). The obstruction may be detected in any manner. For example, the obstruction may be detected through motion, through a comparison of images, through a distance determination, or through any other means.

At 220, the location where the obstruction crosses the border of the illumination field is determined. This corresponds to determining location 114 (FIG. 1B). Location 114 represents the location at which obstruction 112 crosses the border of illumination field 110. Location 114 may be determined in any manner without departing from the scope of the present invention. For example, image processor 120 may perform image processing on images received from imager 140 to determine where the obstruction crosses the border.

At 230, a point on the obstruction that is furthest from where the obstruction crosses the border is determined. This corresponds to determining the location of point 116 in FIG. 1C. Point 116 is the point that is furthest from location 114. The location of point 116 may be determined in any manner without departing from the scope of the present invention. For example, in some embodiments, location 114 is collapsed into a centroid, and distance calculations are performed from the centroid to points on the object. Due to many factors, including image noise, image resolution, and approximations, point 116 may not be the exact the tip of the finger as shown in FIG. 1C. The terms "point," "furthest point," and the like, are meant to encompass points that are near enough to the tip of an obstruction so as to make them useful as cursor locations.

Figure 3:
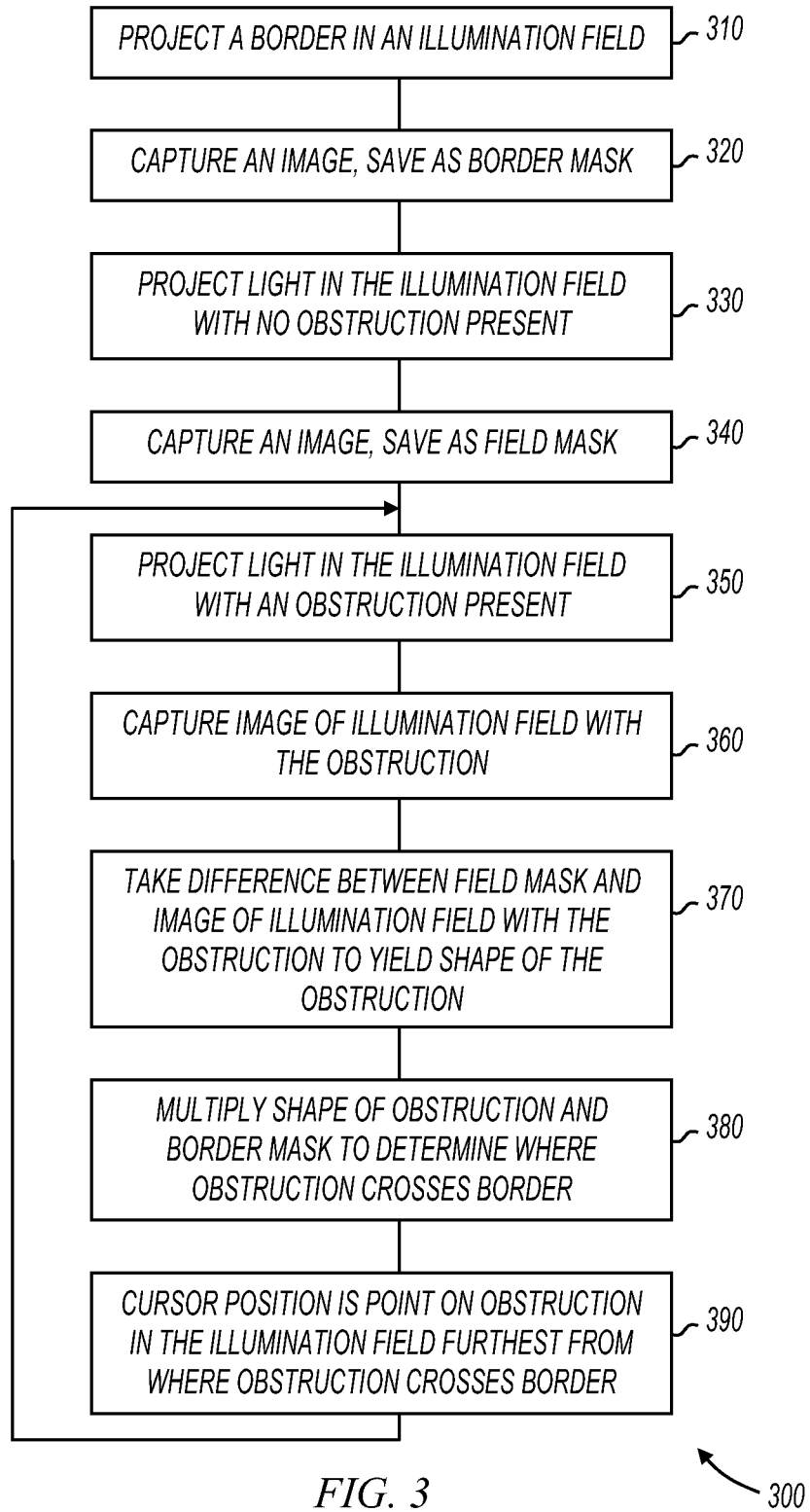

FIG. 3 shows a flowchart in accordance with various embodiments of the present invention. In some embodiments, method 300, or portions thereof, is performed by an interactive projection system, embodiments of which are shown in figures. In other embodiments, method 300 is performed by a series of circuits or an electronic system. Method 300 is not limited by the particular type of apparatus performing the method. The various actions in method 300 may be performed in the order presented, or may be performed in a different order. Further, in some embodiments, some actions listed in FIG. 3 are omitted from method 300.

Method 300 is shown beginning with block 310 in which a border is projected in an illumination field. This corresponds to projecting a border around the border of illumination field 110 (FIG. 1A). In some embodiments, the border is illuminated with visible light, and in other embodiments, the border is illuminated with nonvisible light such as infrared light.

At 320, an image is captured and saved as a border mask. For example, an infrared border may be captured by an infrared imager, and the resulting image may be saved as a border mask. In some embodiments, the border mask is operated on by an image processor to "binarize" the image. The term "binarize" refers to the process of assigning each pixel in the image a value of either zero or one based on the intensity value for that pixel. Accordingly, the border mask may provide an image that is blank (pixels=0) in the center and non-blank (pixels=1) around the border.

In some embodiments, a border mask is created by capturing an image and then extending the edges of the image to create a second image and then taking a difference between the two images. The various embodiments of the invention are not limited by the manner in which the border mask is created.

At 330, light is projected in the illumination field with no obstruction present, and at 340, an image is captured and saved as a field mask. The field mask provides an image of the illumination field without an obstruction present. The light projected at 330 may be visible or nonvisible. For example, the light may be red, green, blue, infrared, or any other wavelength. The light projected at 330 is not necessarily the same type of light projected at 310. For example, the light projected at 310 may be infrared, while the light projected at 330 may be in the visible spectrum.

At this point in method 300, a border mask and a field mask have been saved. The border mask provides an outline of the projector's illumination field that will be useful in determining where any obstruction crosses that outline. The field mask provides an image of a static background of the projector's illumination field that will be useful when determining if an obstruction is present. In some embodiments, the border mask and field mask are created when the projector is turned on, and in other embodiments, the border mask and field mask are created periodically. The remaining portion of method 300 may operate continuously with the same border mask and field mask, or may operate for a first period of time with one border mask and field mask, and then operate for a second period of time with a second border mask and field mask. In still further embodiments, the border mask is kept constant while the field mask is periodically updated.

At 350, light is projected in the illumination field with an obstruction present. In some embodiments, this occurs while user content is being projected. For example, a computer may utilize a projector for a display, and the projector may project light that corresponds to the computer display during the same time period that light is projected at 350. For example, a projector may display alternating frames that alternately display output from the computer and output meant to illuminate the obstruction. In some embodiments, the projector periodically projects nonvisible light to illuminate the obstruction. This allows the obstruction to be illuminated (and detected) without disrupting a user's perception of the visible display.

The light projected at 350 may be projected by any type of projector and may be uniform or nonuniform. For example, a projector that includes a panel (e.g., LCoS) may project a uniform field of light in to the illumination field. Also for example, a scanning projector may project a nonuniform field of light in to the illumination field.

At 360, an image of the illumination field with the obstruction is captured. The image captured at 360 is the illumination field illuminated with the light projected at 350. This image includes the obstruction and a portion of the static background that was captured as part of the field mask at 340.

At 370, the image captured at 360 is compared to the field mask to yield the shape of the obstruction. In the embodiments, a pixel-by-pixel difference is taken between the image captured at 360 and the field mask. The portions of the image that substantially match the field mask (where the obstruction is not present) will have small difference values, whereas the portions of the image that do not substantially match the field mask (where the obstruction is present) will have larger difference values.

In some embodiments, the result of 370 is binarized. This produces an image that has ones where the obstruction is present and zeros where the obstruction is not present. The binarization process compares each pixel value to a threshold and determines whether to assign a one or zero to each pixel based on the threshold comparison. The threshold may be fixed or variable. In some embodiments, the threshold is modified adaptively.

At 380, the shape of the obstruction and the border mask are compared to determine where the shape of the obstruction crosses the border of the illumination field. In some embodiments, this comparison is a pixel-by-pixel multiplication operation. For example, a binarized border mask may be multiplied by a binarized obstruction shape image. The result is an image that has ones for pixels where the obstruction crosses the border. An example is shown at 114 in FIG. 1B.

At 390, a point on the obstruction is found that is furthest from where the obstruction crosses the border, and that point is set as the cursor position. For example, as shown in FIG. 1C, point 116 is determined to be the point on the obstruction that is furthest from where obstruction 112 crosses the border at 114. The point may be found in any manner without departing from the scope of the present invention. For example, the distance between each point within the shape of the obstruction and where the obstruction crosses the border may be computed and then compared.

Actions 350-390 may be repeated periodically to continuously monitor a cursor position. For example, as the obstruction moves in the illumination field, actions 350-390 track the position of the cursor.

Some embodiments of the present invention interpret cursor locations and/or movements as actions. For example, a dwell time may be interpreted as a mouse click or double click. Further, in some embodiments, small fast movements of the cursor are interpreted as mouse clicks. The position and/or movement of the cursor may be interpreted in any manner without departing from the scope of the present invention.

Various embodiments of the present invention are embodied in a software development kit that is provided to software developers. For example, users or developers may use a software development kit in an interactive projection system such as system 100 to gain access to cursor locations and mouse clicks.

Figure 4:
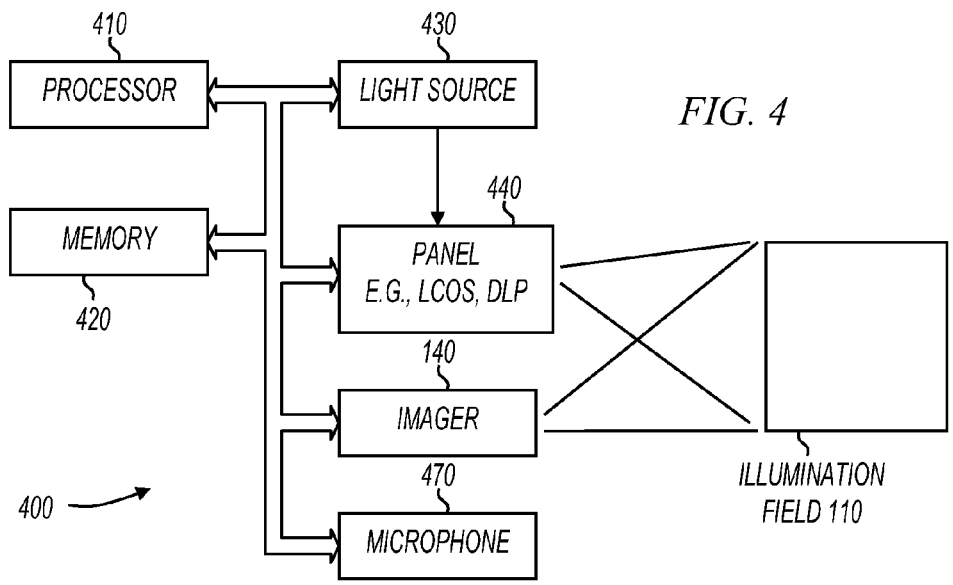
FIGS. 4 and 5 show interactive projection systems with display panels in accordance with various embodiments of the present invention.

FIG. 4 shows an interactive projection system with a display panel in accordance with various embodiments of the present invention. System 400 includes processor 410, memory 420, light source 430, panel 440, imager 140, and microphone 470.

Processor 410 may be any apparatus or component that can interface with memory 420 and operate on data received from imager 140. For example, in some embodiments, processor 410 may be a microprocessor or a digital signal processor. In other embodiments, processor 410 may be a dedicated processor such as a processor included in an application specific integrated circuit (ASIC). Any processing element, including any combination of hardware and/or software may be utilized without departing from the scope of the present invention.

Memory 420 may be any medium readable by processor 410. For example, memory 420 may be a machine or computer-readable medium that has instructions stored or encoded thereon that when executed result in the processor performing one or more method embodiments of the present invention. Memory 420 may be solid state memory such as random access memory (RAM), read-only memory (ROM), or FLASH memory. Memory 420 may also be any other type of storage medium such as magnetic disk, compact disc (CD), or the like.

Light source 430 provides light to panel 440. Light source 430 may source any type of light. For example, in some embodiments, light source 430 sources visible light, and in other embodiments, light source 430 sources nonvisible light. Light source 430 may source light at any wavelength without departing from the scope of the present invention. In some embodiments, light source 430 sources coherent light, and in other embodiments, light source 430 sources noncoherent light. For example, in some embodiments, light source 430 sources laser light. Also for example, in some embodiments, light source 430 is a light emitting diode (LED) that emits noncoherent light.

Panel 440 receives light from light source 430 and projects light into illumination field 110. In some embodiments, panel 440 is transmissive, and in other embodiments, panel 440 is reflective. For example, panel 440 may be a liquid crystal display (LCD), a liquid crystal on silicon (LCoS) display, a digital light processing (DLP™) display, or the like. As described above, imager 140 includes at least one light sensor to capture an image of illumination field 110.

Microphone 470 is coupled to processor 410 to detect noises that can be processed. For example, in some embodiments, microphone 470 detects noises produced when an obstruction taps an object in the illumination field. As an example, referring now back to FIG. 1, obstruction 112 may be tapped against a wall or other object to simulate a mouse click. Microphone 470 may record the sound and processor 410 may interpret the sound as a mouse click. Some embodiments may include a calibration sequence in which a user is prompted to make a noise that is to serve as a mouse click. This noise is recorded by microphone 470 as a template for mouse click sounds. Although microphone 470 is only shown in FIG. 4, any of the embodiments described herein may include a microphone.

In operation, panel 440 projects light in to illumination field 110 and imager 140 captures an image. In some embodiments, panel 440 projects infrared light and imager 470 captures infrared light. In other embodiments, panel 440 projects red, green, or blue light and imager 470 captures visible light. In some embodiments, projector 400 captures a border mask and a field mask in accordance with method 300 (FIG. 3). Projector 400 also projects light in to the illumination field and captures images when an obstruction is present. Processor 410 compares the various images, detects the obstruction, determines where the obstruction crosses the border of the illumination field, and determines a point on the obstruction in the illumination field that is furthest from where the obstruction crosses the border. This point may be used as a cursor position.

Figure 5:
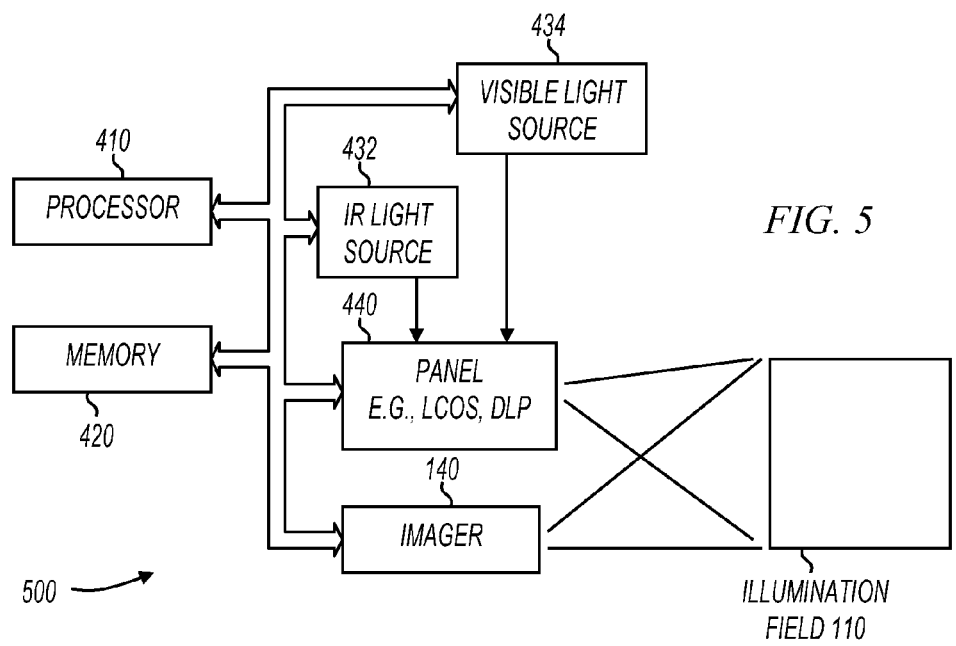

FIG. 5 shows an interactive projection system with a display panel in accordance with various embodiments of the present invention. System 500 includes processor 410, memory 420, infrared light source 432, visible light source 434, panel 440, and imager 140.

Processor 410, memory 420, panel 440, and imager 140 are described above. System 500 includes visible and nonvisible light sources. In some embodiments, visible light source 434 is used to project one or more images. For example, system 500 may function as a computer display where visible light source 434 displays visible images. In some embodiments, infrared light source 432 is used to project light into an illumination field that is used to detect an obstruction and determine a point on the obstruction that is to be used as a cursor position.

In some embodiments, infrared light from light source 432 is interlaced with visible light from light source 434. For example, system 500 may project infrared light every other frame or every nth frame. In other embodiments, infrared light is projected at the same time as visible light. In these embodiments, imager 140 may detect light at the infrared wavelength of IR light source 432. In these embodiments an obstruction can be detected even while a visible display is being projected.

Figure 6:
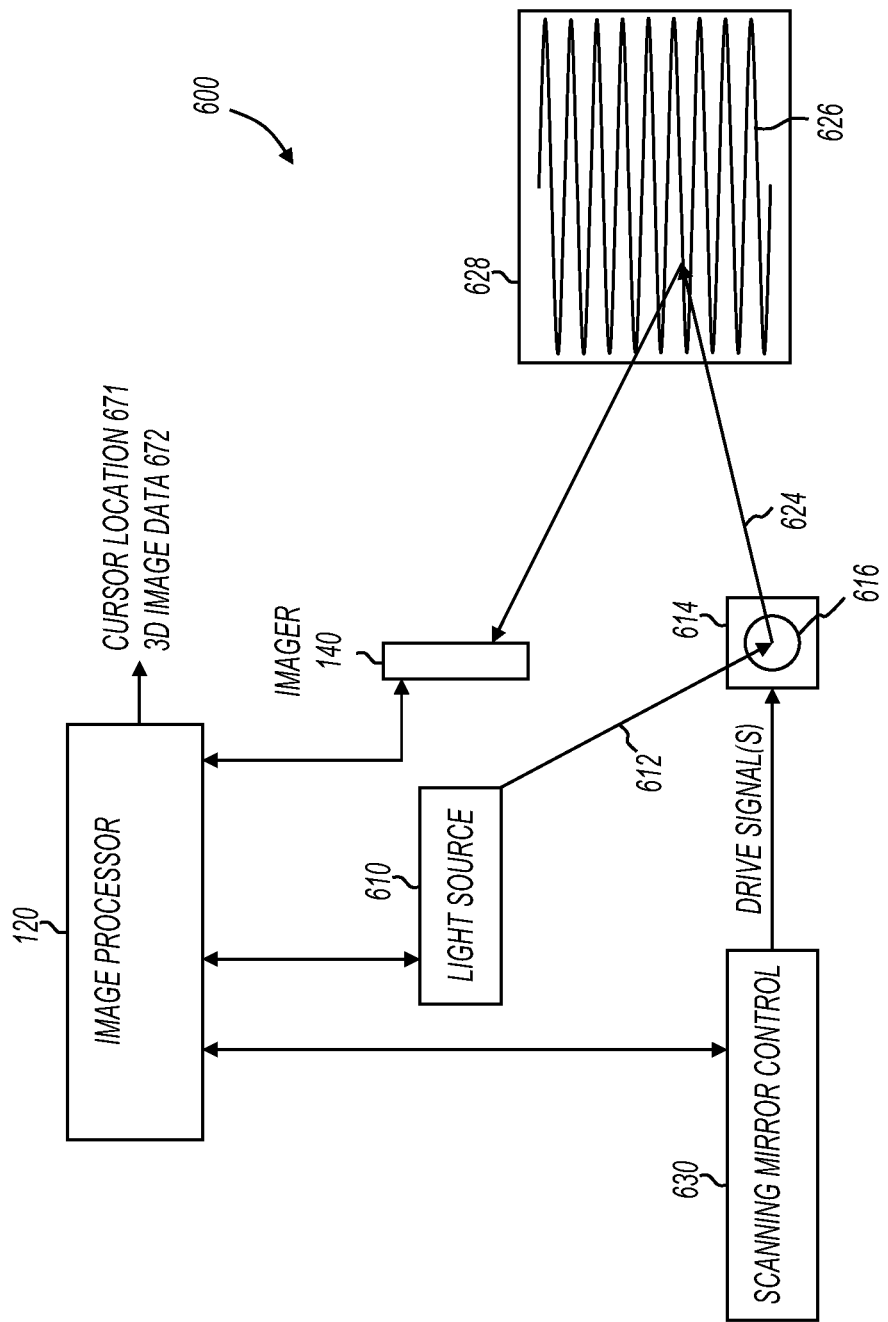
FIGS. 6 and 7 show interactive scanning laser projection systems in accordance with various embodiments of the present invention.

FIG. 6 shows an interactive scanning laser projection system in accordance with various embodiments of the present invention. System 600 includes a light source 610, which may be a laser light source such as a laser diode or the like, capable of emitting a beam 612 which may be a laser beam. The beam 612 impinges on a scanning platform 614 which is part of a microelectromechanical system (MEMS) based scanner or the like, and reflects off of scanning mirror 616 to generate a controlled output beam 624. A scanning mirror control circuit 630 provides one or more drive signal(s) to control the angular motion of scanning mirror 616 to cause output beam 624 to generate a raster scan 626 on a projection surface 628.

In some embodiments, raster scan 626 is formed by combining a sinusoidal component on the horizontal axis and a sawtooth component on the vertical axis. In these embodiments, controlled output beam 624 sweeps back and forth left-to-right in a sinusoidal pattern, and sweeps vertically (top-to-bottom) in a sawtooth pattern with the display blanked during flyback (bottom-to-top). FIG. 6 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the invention are not limited by the waveforms used to control the vertical and horizontal sweep or the resulting raster pattern.

System 600 also includes image processor 120 and imager 140. In some embodiments, imager 140 is a light detection device that includes an array of photosensitive elements that detect either or both of visible and nonvisible light. For example, imager 140 may be a charge coupled device (CCD) or a CMOS image sensor.

In operation, light source 610 produces light pulses and scanning mirror 616 reflects the light pulses as beam 624 traverses raster pattern 626. This results in a series of time-multiplexed light spots on projection surface 628 along raster pattern 626. Imager 140 captures images created as the light pulses hit projection surface 628. Image processor 120 receives images from imager 140 and produces a cursor position and/or 3D image data.

The illumination field of system 600 may be the extents of the raster scan 626, or may be less than the extents of raster scan 626. For example, raster scan may have "overscan" regions at the top, bottom, left, and right sides of raster scan 626 where no image is displayed.

Various embodiments of the invention determine a cursor position 671 by detecting an obstruction in the illumination field, determining where the obstruction crosses a border of the illumination field, and determining a point on the obstruction that is furthest from where the obstruction crosses the border.

In some embodiments, a border mask is created by illuminating pixels at the border of an illumination field and then capturing an image. The illumination field may or may not coincide with the edge of projection surface 628. Further, the illumination field may or may not coincide with the extents of raster scan 626. The border may or may not be illuminated with uniformly or nonuniformly spaced pixels. For example, in some embodiments, pixels are spaced tightly in the raster scan 626 and the pattern follows the trajectory of the beam resulting in nonuniformly spaced pixels. In other embodiments, the beam is turned on at times to create substantially uniformly spaced pixels.

The various embodiments of system 600 create a field mask by projecting light into the illumination field without an obstruction present and capturing an image. System 600 may detect an obstruction in the illumination field by capturing an image and comparing it to the field mask. The various images captured and compared by system 600 may or may not have the same pixel spacing. For example, the border mask may have one pixel spacing pattern, the field mask may have a second pixel spacing pattern, and images captured with an obstruction present may have a third pixel spacing pattern. Image processing techniques such as averaging and/or interpolation between pixels may be utilized to compare images with disparate pixel patterns.

Imager 140 may be able to integrate for any period of time and therefore may be able to capture any number of displayed pixels. For example, in some embodiments, imager 140 integrates over a complete frame and captures an image in which the entire illumination field is illuminated. Also for example, in some embodiments, imager 140 integrates over less than a complete frame and captures images in which less than the entire illumination field is illuminated. As described below, 3D imaging may be performed when images are captured in which less than the entire illumination field is illuminated. Three dimensional data may be utilized for any purpose. For example, in some embodiments, 3D data 672 is used to detect mouse clicks.

In embodiments that produce 3D data, image processor 120 produces 3D image data 672 using knowledge of the scanning mirror position, the timing of the light pulses produced by light source 610, and the images captured by imager 140. The 3D image data 672 represents the distance from the scanning mirror 616 to each of the light spots created when a pixel or group of pixels is reflected from projection surface 628. When a three dimensional obstruction is placed in front of projection surface 628, the 3D image data 672 represents the surface contour of the obstruction.

Scanning mirror 616 and imager 140 are displaced laterally so as to provide parallax in the field of view of imager 140. Because of the parallax, a difference in distance between imager 140 and a light spot is manifested as a change in the position of the light spot within an image captured by imager 140. Triangulation computations are performed for each detected light spot (or for the centroid of adjacent light spots) to determine the underlying topography of the obstruction. Parallax and triangulation are discussed further below with reference to FIG. 7.

Image processor 120 may influence the operation of light source 610 and scanning mirror control circuit 630 or may receive information regarding their operation. For example, in some embodiments, image processor 120 may control the timing of light pulses produced by light source 610 as well as the timing of the raster pattern. In other embodiments, other circuits (not shown) control the timing of the light pulses and the raster pattern, and image processor 120 is provided this timing information.

Image processor 120 may be implemented in hardware, software, or in any combination. For example, in some embodiments, image processor 120 is implemented in an application specific integrated circuit (ASIC). Further, in some embodiments, some of the faster data acquisition is performed in an ASIC and overall control is software programmable.

In some embodiments, image processor 120 includes a phase lock loop (PLL) to phase lock the timing of light spots and 2D image capture. For example, image processor 120 may command imager 140 to provide a frame dump after each light spot. The frame dump may include any number of bits per pixel. For example, in some embodiments, imager 140 captures one bit per pixel, effectively thresholding the existence or nonexistence of a light spot at a given pixel location. In other embodiments, imager 140 captures two or three bits per pixel. This provides a slight increase in resolution, while still providing the advantage of reduced computational complexity. In still further embodiments, imager 140 captures many more bits per pixel.

In some embodiments, light source 610 sources nonvisible light such as infrared light. In these embodiments, imager 140 is able to detect the same nonvisible light. For example, in some embodiments, light source 610 may be an infrared laser diode that produces light with a wavelength of substantially 808 nanometers (nm). Also in some embodiments, light source 610 may be an infrared laser diode that produces eye-safe light with a wavelength in the range of 1550 nm. In other embodiments, light source 110 sources visible light such as blue light. In these embodiments, imager 140 is able to detect the same visible light. For example, in some embodiments, light source 610 may be a blue laser diode that produces light with a wavelength of substantially 405 nanometers (nm). The wavelength of light is not a limitation of the present invention. Any wavelength, visible or nonvisible, may be used without departing from the scope of the present invention.

In some embodiments, imager 140 is able to detect both visible and nonvisible light. For example, light source 610 may source nonvisible light pulses, while imager 140 detects both the nonvisible light pulses and visible light. In these embodiments, the 3D image data 672 may include color and depth information for each pixel. An example might be the fourtuple (Red, Green, Blue, Distance) for each pixel.

In some embodiments, mirror 616 scans in one dimension instead of two dimensions. This results in a raster pattern that scans back and forth on the same horizontal line. These embodiments can produce a 3D profile of an obstruction where the horizontal line intersects the object.

Figure 7:
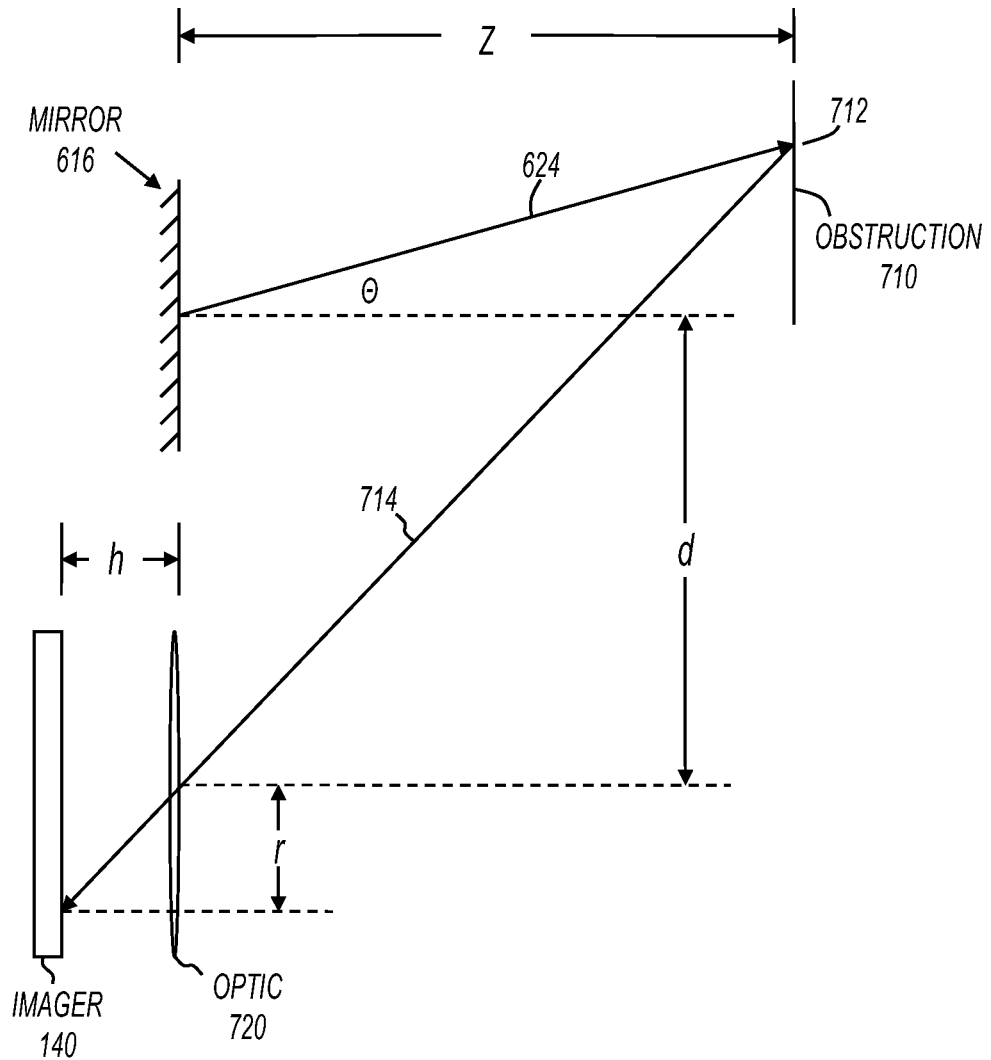

FIG. 7 shows the determination of distance as a function of detected light position in a 2D image sensor. FIG. 7 shows mirror 616, imager 140, optic 720, and obstruction 710. In operation, beam 624 reflects off of mirror 616. The light source is not shown. Beam 624 creates a light spot on the object being imaged at 712. Ray 714 shows the path of light from light spot 712 through optic 720 to imager 140.

Using triangulation, the distance from the plane of the mirror to the light spot (z) is determined as:

$$z = \frac{hd}{r - h\tan\Theta} \quad (1)$$

where:
d is the offset distance between the mirror and the optic;
Θ is the beam angle;
h is the distance between the optic and the image sensor; and r is the offset of the light spot within the field of view of the image sensor.

Various embodiments of the invention determine three dimensional data for both a projection surface and an obstruction. When a cursor location is determined on the obstruction, the 3D data corresponding to the cursor location may be utilized for any purpose, including interpreting mouse clicks.

Figure 8:
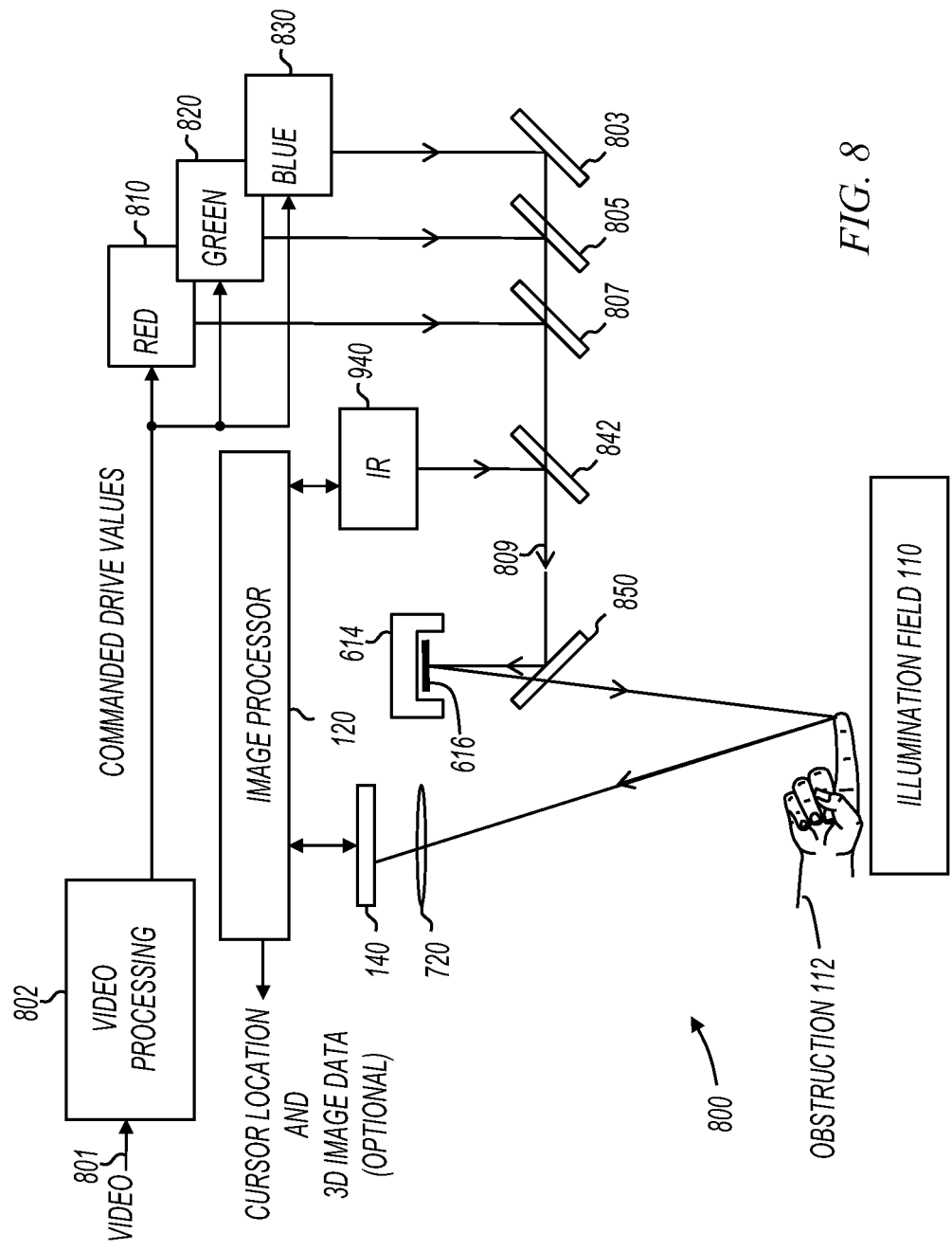
FIG. 8 shows the determination of distance as a function of detected light position in a 2D image sensor.

FIG. 8 shows an interactive scanning laser projection system in accordance with various embodiments of the present invention. System 800 combines a laser projector with interactive capabilities and optional 3D imaging capabilities. The system receives and displays video content in red, green, and blue, and uses infrared light for user interaction and 3D imaging.

System 800 includes video processing component 802, red laser module 810, green laser module 820, blue laser module 830, and infrared laser module 890. Light from the laser modules is combined with mirrors 803, 805, 807, and 842. System 800 also includes fold mirror 850, scanning platform 614 with scanning mirror 616, optic 720, imager 140, and image processor 120.

In operation, video processing component 802 processes video content at 801 using two dimensional interpolation algorithms to determine the appropriate spatial image content for each scan position. This content is then mapped to a commanded current for each of the red, green, and blue laser sources such that the output intensity from the lasers is consistent with the input image content. In some embodiments, this process occurs at output pixel speeds in excess of 150 MHz.

The laser beams are then directed onto an ultra-high speed gimbal mounted 2 dimensional bi-axial laser scanning mirror 616. In some embodiments, this bi-axial scanning mirror is fabricated from silicon using MEMS processes. In some embodiments, the vertical axis of rotation is operated quasi-statically and creates a vertical sawtooth raster trajectory, and the horizontal axis is operated on a resonant vibrational mode of the scanning mirror. In some embodiments, the MEMS device uses electromagnetic actuation, achieved using a miniature assembly containing the MEMS die, small subassemblies of permanent magnets and an electrical interface, although the various embodiments are not limited in this respect. For example, some embodiments employ electrostatic actuation. Any type of mirror actuation may be employed without departing from the scope of the present invention.

Embodiments represented by FIG. 8 combine the video projection described in the previous paragraph with IR laser module 840, optic 720, imager 140, and image processor 120 for user interaction and optional 3D imaging of the projection surface and any obstruction 112. The IR laser and image sensor may be used to invisibly probe the environment with programmable spatial and temporal content at line rates related to the scan frequency of mirror 616. In some embodiments this may be in excess of 54 kHz (scanning both directions at 27 kHz). Image processor 120 receives the output of imager 140 and produces a cursor location and optional 3D image data as described above with reference to previous figures.

Figure 9:
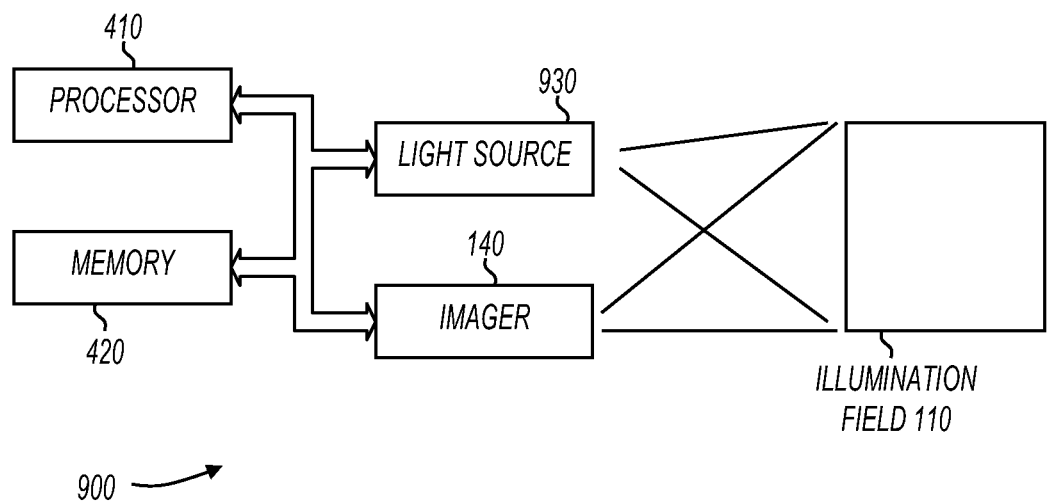
FIG. 9 shows an interactive projection system in accordance with various embodiments of the present invention.

FIG. 9 shows an interactive projection system in accordance with various embodiments of the present invention. System 900 includes processor 410, memory 420, light source 930, and imager 140.

Processor 410, memory 420, and imager 140 are described above. In some embodiments, light source 930 is used to broadly illuminate field 110. For example, light source 930 may be an infrared light emitting diode (LED) used to project infrared light into an illumination field that is used to detect an obstruction and determine a point on the obstruction that is to be used as a cursor position.

Figure 10:
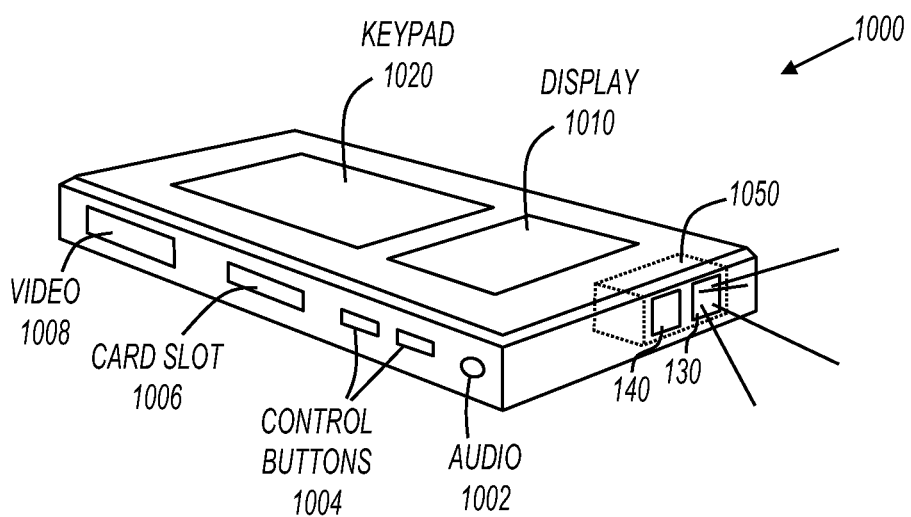
FIG. 10 shows a mobile device in accordance with various embodiments of the present invention.

FIG. 10 shows a mobile device in accordance with various embodiments of the present invention. Mobile device 1000 may be a hand held interactive projector with or without communications ability. For example, in some embodiments, mobile device 1000 may be an interactive projection device with little or no other capabilities. Also for example, in some embodiments, mobile device 1000 may be a device usable for communications, including for example, a cellular phone, a smart phone, a personal digital assistant (PDA), a global positioning system (GPS) receiver, or the like. Further, mobile device 1000 may be connected to a larger network via a wireless (e.g., WiMax) or cellular connection, or this device can accept and/or transmit data messages or video content via an unregulated spectrum (e.g., WiFi) connection.

Mobile device 1000 includes interactive projection system 1050 to enable interaction with the projected display. Interactive projection system 1050 may be any of the interactive projection systems described herein, such as device 100 (FIG. 1), 400 (FIG. 4), 500 (FIG. 5), 600 (FIG. 6), 700 (FIG. 7), or 900 (FIG. 9). Interactive projection system 1050 is shown having illuminator 130 and image sensor 140. Mobile device 1000 also includes many other types of circuitry; however, they are intentionally omitted from FIG. 10 for clarity.

Mobile device 1000 includes display 1010, keypad 1020, audio port 1002, control buttons 1004, card slot 1006, and audio/video (A/V) port 1008. None of these elements are essential. For example, mobile device 1000 may only include interactive display system 1050 without any of display 1010, keypad 1020, audio port 1002, control buttons 1004, card slot 1006, or A/V port 1008. Some embodiments include a subset of these elements. For example, an accessory projector product that includes interactive projection capabilities may include interactive projection system 100 (FIG. 1), control buttons 1004 and A/V port 1008.

Display 1010 may be any type of display. For example, in some embodiments, display 1010 includes a liquid crystal display (LCD) screen. Display 1010 may or may not always display the same image that is projected by interactive display system 1050. For example, an accessory product may always display the same image that is projected, whereas a mobile phone embodiment may project one image while displaying different content on display 1010. Keypad 1020 may be a phone keypad or any other type of keypad.

A/V port 1008 accepts and/or transmits video and/or audio signals. For example, A/V port 1008 may be a digital port that accepts a cable suitable to carry digital audio and video data. Further, A/V port 1008 may include RCA jacks to accept or transmit composite inputs. Still further, A/V port 1008 may include a VGA connector to accept or transmit analog video signals. In some embodiments, mobile device 1000 may be tethered to an external signal source through A/V port 1008, and mobile device 1000 may project content accepted through A/V port 1008. In other embodiments, mobile device 1000 may be an originator of content, and A/V port 1008 is used to transmit content to a different device.

Audio port 1002 provides audio signals. For example, in some embodiments, mobile device 1000 is a portable media player that can play audio and video. In these embodiments, the video may be projected by interactive display system 1050 and the audio may be output at audio port 1002.

Mobile device 1000 also includes card slot 1006. In some embodiments, a memory card inserted in card slot 1006 may provide a source for audio to be output at audio port 1002 and/or video data to be projected by interactive display system 1050. Card slot 1006 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 11:
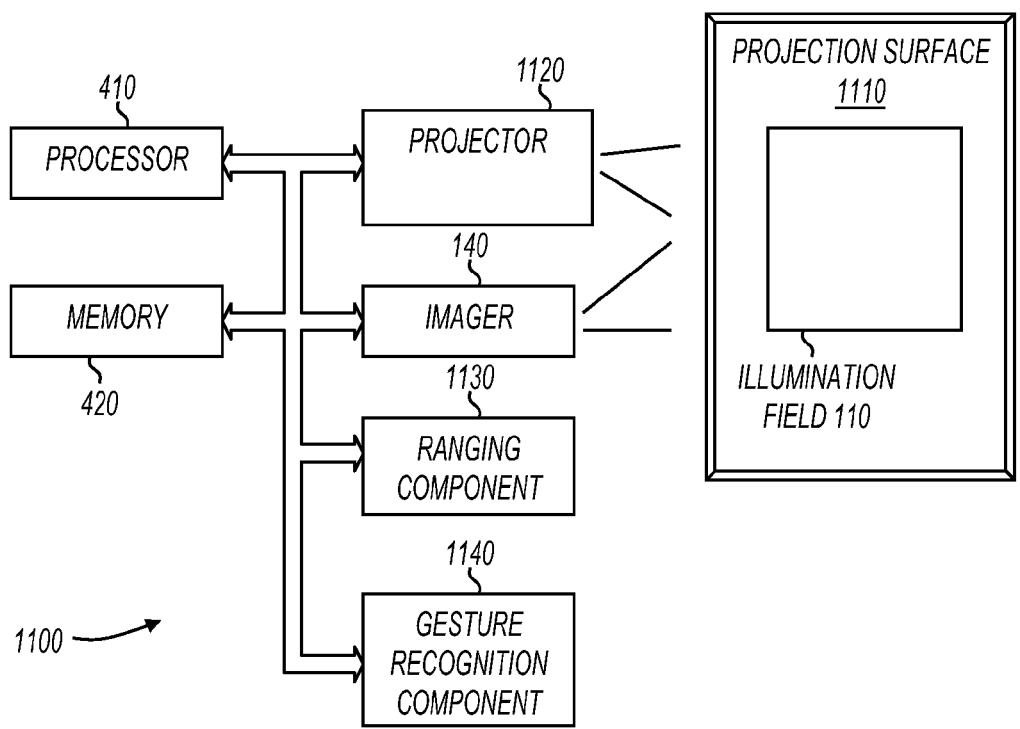
FIG. 11 shows an interactive projection system with gesture recognition.

FIG. 11 shows an interactive projection system with gesture recognition. System 1100 includes processor 410, memory 420, projector 1120, imager 140, ranging component 1130, and gesture recognition component 1140.

Processor 410, memory 420, imager 140, and illumination field 110 are described above with reference to earlier figures. Projector 1120 may include any type of projection apparatus. For example, projector 1120 may include any type of panel-based projection apparatus described above. Also for example, projector 1120 may include any type of scanning projection apparatus described above. Projector 1120 may source visible light, nonvisible light, or any combination.

In operation, projector 1120 projects light into illumination field on projection surface 1110. Projection surface 1110 may be any surface with any features. For example, projector 1120 may be pointed at anything that becomes projection surface 1110 when light is projected thereon.

Ranging component 1130 determines one or more distances between projector 1120 and either projection surface 1110 or an obstruction in illumination field 110. For example, ranging component 1130 may include hardware, software, or any combination, to triangulate the distance to a point that reflects light as described above with reference to FIG. 7. In some embodiments, ranging component 1130 includes software instructions that when executed by processor 410, cause processor 410 to determine the distances.

Gesture recognition component 1140 interprets movements of points within illumination field 110 as gestures. For example, a cursor position on an obstruction may be determined as described above. When the cursor position is repeatedly determined, then movements of the cursor position may also be determined. Gesture recognition component 1140 may then interpret these movements. In some embodiments, gestures may be determined to be mouse clicks, drag and drop operations, zoom operations, or any other operation. Further examples of gestures are provided below.

Gesture recognition component 1140 may include hardware, software, or any combination. For example, in some embodiments, gesture recognition component 1140 may include software instructions that when executed by processor 410 cause the processor to interpret cursor movements as gestures. Also for example, in some embodiments, gesture recognition component 1140 may include a programmable set of gestures.

Figure 12:
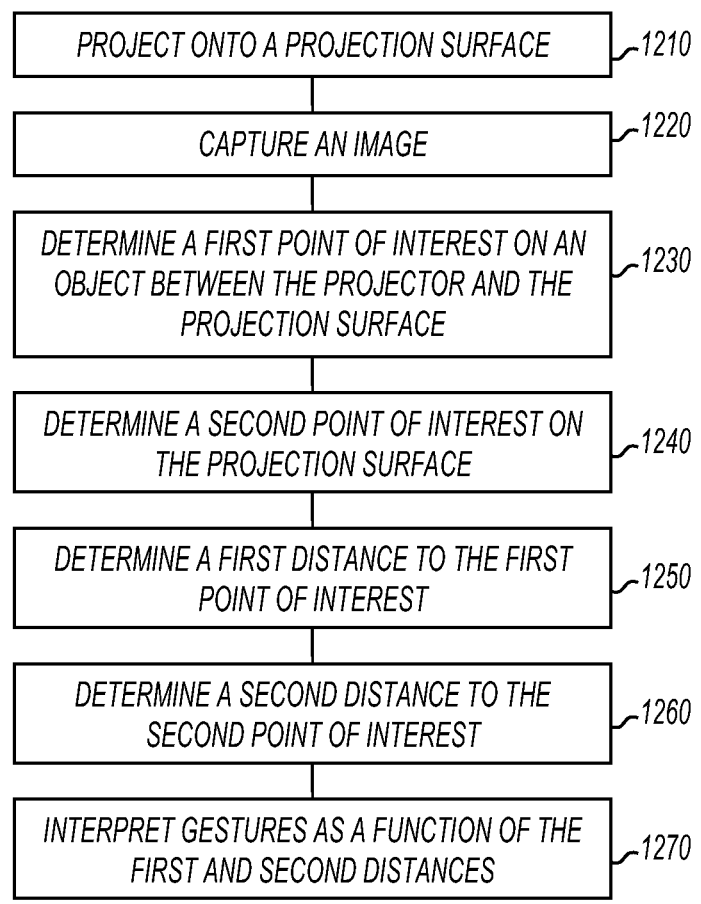
FIG. 12 shows a flowchart of methods in accordance with various embodiments of the present invention.

FIG. 12 shows a flowchart of methods in accordance with various embodiments of the present invention. In some embodiments, method 1200, or portions thereof, is performed by an interactive projection system with gesture recognition, embodiments of which are shown in the figures. In other embodiments, method 1200 is performed by a series of circuits, a mobile device, or an electronic system. Method 1200 is not limited by the particular type of apparatus performing the method. The various actions in method 1200 may be performed in the order presented, or may be performed in a different order. Further, in some embodiments, some actions listed in FIG. 12 are omitted from method 1200.

Method 1200 is shown beginning with block 1210 in which a device projects onto a projection surface. This corresponds to a projector such as projector 1120 projecting onto a surface such as projection surface 1110. In some embodiments, the projector projects visible light, and in other embodiments, the projector projects invisible light. In still further embodiments, the projector projects both visible and nonvisible light. At 1220, an image is captured. This corresponds to an imager such as imager 140 capturing an image. The image may include one or more visible colors, or may be in the nonvisible spectrum. Further, the imager may capture images at any resolution, including single bit resolution.

Figure 13:
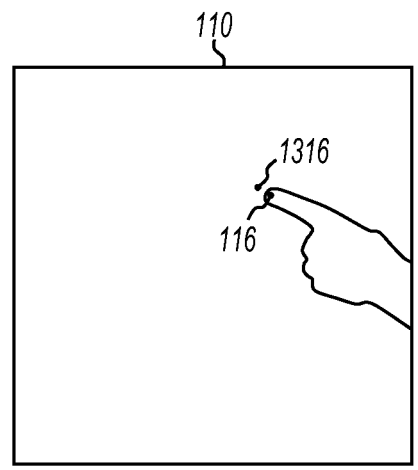
FIGS. 13-16 show points of interest in an illumination field in accordance with various embodiments of the invention.

At 1230, a first point of interest on an object between the projector and the surface is determined. In some embodiments, this is accomplished by determining where the object crosses a border of the image and then identifying a point on the object furthest from where the object crosses the border. Various methods for determining the point of interest are described above with reference to earlier figures. The point of interest may be used as a cursor location. Referring now to FIG. 13, a first point of interest may be determined as point 116 at the end of the obstruction.

Figure 14:
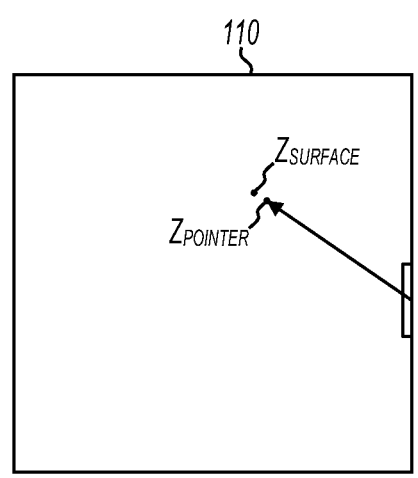

Referring now back to FIG. 12, at 1240, a second point of interest on the projection surface is determined. In some embodiments, the second point of interest is determined as a point in the vicinity of the first point. For example, the second point may be just beyond the tip of the object. Also for example, the second point may be calculated as a centroid of many points in the vicinity of the first point. Referring now to FIG. 13, a second point may be determined as point 1316 just beyond the tip of the object and just beyond the first point 116. Referring now to FIG. 14, a vector to the first point is shown, and the second point is shown in the same general direction as the vector, but just beyond the first point.

Referring now back to FIG. 12, at 1250, a first distance to the first point is determined, and at 1260, a second distance to the second point is determined. In some embodiments, the first and second distances are determined using triangulation as described above with reference to FIG. 7. Referring now to FIG. 14, the distance to the first point is shown as $Z_{POINTER}$, and the distance to the second point is shown as $Z_{SURFACE}$. The difference between the first and second distances is the distance of the object (pointer) to the projection surface.

In some embodiments, a small dot of infrared light is projected on the point of interest using an infrared light source such as shown in, and described with reference to, FIG. 8. The imager may then capture a 2D image that includes the infrared dot, and the distance to the point can then be triangulated. Any number of points of interest may be triangulated for distance; however, determining the points of interest before performing the triangulation reduces the computational complexity as compared to triangulating distance for all points.

In some embodiments, gestures are interpreted as a function of the first and second distances 1270. For example, a gesture may not be recognized unless the difference between the first and second distances is below a threshold indicating that the object being used as a pointer is close to, or touching, the projection surface. In other embodiments, the first or second derivative of the difference is used. For example, if a user taps a pointer against the projection surface, the resulting changes in velocity and/or acceleration may be used to interpret gestures.

In some embodiments, recognized gestures mimic interaction with a capacitive touch screen on a mobile device. For example, movement of a pointer in front of the projection surface may be interpreted as a "touch" similar to the touch interaction common on mobile devices such as smartphones, tablets, and game consoles. In some embodiments, a mobile device such as mobile device 1000 (FIG. 10) includes a touch screen as well as a projector and gesture recognition components that can mimic the touch screen. A user may interact with the mobile device by touching the screen or by gesturing in front of the projection surface.

Figure 15:
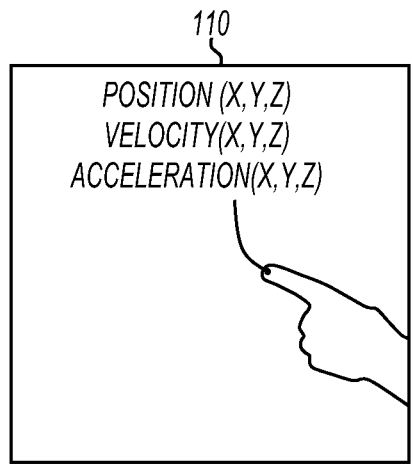

FIG. 15 shows an object with a point of interest in an illumination field. The point of interest may be used as a cursor location as described above. An interactive projection system with gesture recognition may determine the location and movement of the point of interest, also as described above. In some embodiments, the interactive projection system determines the position, velocity, and acceleration of the point of interest as shown in FIG. 15. Accordingly, the gesture recognition component within the interactive projection system may have information describing position, velocity, and acceleration in three dimensions (x, y, and z).

The x and y coordinates shown in FIG. 15 are nominally in the plane of the projection surface, and the z coordinate is nominally normal to the projection surface, although this is not a limitation of the present invention. For example, when the projection surface is not at a right angle to the projector, or if the projection surface is not uniform, x, y, and z may only describe coordinates in a reference frame defined by the projector. The gesture recognition component may interpret movement in the plane of the projection surface or movement orthogonal to the projection surface.

In some embodiments, the gesture recognition component interprets gestures that are compatible with mouse operations in a personal computer. In other embodiments, the gesture recognition component interprets gestures that are compatible with handheld devices with touch screens. For example, the gesture recognition component may interpret gestures made simultaneously by multiple points of interest. One example is shown in FIG. 16.

Figure 16:
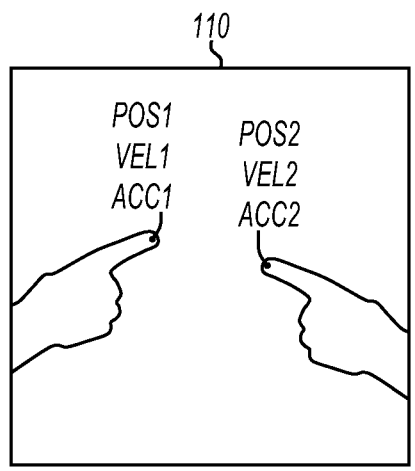

FIG. 16 shows multiple points of interest in an illumination field in accordance with various embodiments of the invention. A projection system with gesture recognition may determine the position, velocity, and acceleration of multiple points of interest as shown in FIG. 16. Gestures may be interpreted as a function of the position, velocity, and acceleration of the multiple points, or any subset thereof.

Example gestures include, but are not limited to:

1. Recognize a "touch" to the projection surface when the distance to the point of interest on the object is within 0.5 inches of distance to the projection surface just beyond the end of the object and the velocity has gone to zero and the acceleration has reversed sign.

2. Recognize a "click" or "double click" when the velocity changes sign twice and the point of interest on the object is within 0.5 inches of the projection surface just beyond the end of the object.

3. Recognize a "scroll up" when the point of interest on the object is located on a scroll bar and the velocity is upward and the point of interest on the object is within 0.5 inches of the projection surface just beyond the end of the object.

4. Recognize a "scroll down" when the point of interest on the object is located on a scroll bar and the velocity is downward and the point of interest on the object is within 0.5 inches of the projection surface just beyond the end of the object.

5. Recognize a "grab" when rotational velocity is clockwise and completes a circle and the point of interest on the object is within 0.5 inches of the projection surface just beyond the end of the pointer.

6. Recognize a "drop" when rotational velocity is counter-clockwise and completes a circle and the point of interest on the object is within 0.5 inches of the projection surface just beyond the end of the pointer.

7. Recognize a "zoom in" when velocity in z is towards the projection surface and the point of interest on the object is over an icon.

8. Recognize a "zoom out" when velocity in z is away from the projection surface and the point of interest on the object is over an icon.

9. Recognize a "zoom in" when two objects are present within 0.5 inches of the projection surface and the distance between the two objects is increasing.

10. Recognize a "zoom out" when two objects are present within 0.5 inches of the projection surface and the distance between the two objects is decreasing.

11. Recognize a "scroll" when two objects are present within 0.5 inches of the projection surface and the both are moving up or down.

The above-listed gestures are examples only, and the various embodiments of the invention are not so limited. Any number and/or type of gestures may be recognized, including those typically used to interact with computers as well as touch screen devices.

Each of the above-listed gestures is described as a function of the distance between the object and the projection surface; however, this is not a limitation of the present invention. For example, gestures may be recognized when one or more objects move within the illumination field regardless of distance.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
   detecting an obstruction in a projector's illumination field, the illumination field having a border;
   determining where the obstruction crosses the border of the illumination field;
   determining a point on the obstruction in the illumination field that is the furthest distance from where the obstruction crosses the border of the illumination field; and
   interpreting movement of the point on the obstruction as a gesture.

2. The method of claim 1 wherein detecting an obstruction comprises comparing captured images of the illumination field with and without the obstruction.

3. The method of claim 2 further comprising:
   projecting infrared light in the illumination field without the obstruction present; and
   capturing an infrared image of the illumination field without the obstruction present.

4. The method of claim 3 further comprising:
   projecting infrared light in the illumination field with the obstruction present; and
   capturing an infrared image of the illumination field with the obstruction present.

5. The method of claim 4 wherein comparing captured images comprises comparing the infrared image of the illumination field without the obstruction present to the infrared image of the illumination field with the obstruction present.

6. The method of claim 1 wherein interpreting movement as a gesture comprises interpreting the movement to be a mouse click.

7. The method of claim 1 wherein the movement includes a component in a plane of a projection surface.

8. The method of claim 1 wherein the movement includes a component orthogonal to a projection surface.

9. The method of claim 1 further comprising:
   measuring a first distance from the projector to the point on the obstruction; and
   measuring a second distance from the projector to a point not on the obstruction;
   wherein the gesture is a function of a difference between the first distance and the second distance.

10. The method of claim 9 wherein the gesture is further a function of a rate of change of the difference between the first distance and the second distance.

11. The method of claim 9 wherein measuring a first distance comprises:
   projecting light on the point on the obstruction;
   detecting reflected light at a sensor having a lateral offset from the projector; and
   triangulating the first distance.

12. The method of claim 11 wherein measuring a second distance comprises:
   projecting light on the point not on the obstruction;
   detecting reflected light at the sensor; and
   triangulating the second distance.

13. A method comprising:
   projecting light in an illumination field of a projector with no obstruction present;
   capturing an image of the illumination field with no obstruction present;
   projecting light in the illumination field with an obstruction present;
   capturing an image of the illumination field with the obstruction present;
   comparing the images of the illumination field with and without the obstruction present to yield a shape of the obstruction;
   determining where the shape of the obstruction crosses a border of the illumination field;
   determining a point on the obstruction in the illumination field that is furthest from where the shape of the obstruction crosses the border; and
   interpreting movement of the point on the obstruction as a gesture.

14. The method of claim 13 further comprising creating a border mask by projecting a border around the illumination field and capturing an image, and wherein determining where the shape of the obstruction crosses the border comprises multiplying the shape of the obstruction and the border mask.

15. The method of claim 13 wherein projecting light in an illumination field comprises reflecting light off of a display panel.

16. The method of claim 13 wherein projecting light in an illumination field comprises transmitting light through a display panel.

17. The method of claim 13 wherein projecting light in an illumination field comprises scanning a light beam.

18. The method of claim 13 wherein projecting light in an illumination field comprises projecting infrared light.

19. The method of claim 13 further comprising:
   repeatedly determining a distance between the point on the obstruction and a point just beyond the obstruction by measuring two distances and taking a difference; and
   interpreting a change in the distance as the gesture.

20. An apparatus comprising:
   an illumination component to project light in an illumination field;
   an image capture component to capture images of the illumination field; and
   an image processing component operable to compare images of the illumination field with and without an obstruction, to determine where the obstruction crosses a border of the illumination field, and to identify a point of interest at a point on the obstruction furthest from the where the obstruction crosses the border, and to interpret movement of the point of interest on the obstruction as a gesture.

21. The apparatus of claim 20 wherein the illumination component comprises a scanning laser projector.

22. The apparatus of claim 21 wherein the scanning laser projector comprises an infrared laser to project light in the illumination field.

23. The apparatus of claim 22 wherein the infrared laser comprises an eye-safe wavelength laser.

24. The apparatus of claim 22 wherein the image capture component comprises an infrared sensor.

25. The apparatus of claim 20 wherein the illumination component comprises a reflective display panel.

26. The apparatus of claim 20 wherein the illumination component comprises a transmissive display panel.

27. The apparatus of claim 20 wherein the illumination component comprises:
   red, green, and blue light sources to project a visible image; and
   an infrared light source to project an invisible image.

28. The apparatus of claim 27 wherein the image capture component comprises an infrared sensor.

29. An apparatus comprising:
   a projector to project onto a projection surface;
   an imager to capture images;
   a processing component to interpret captured images and determine a first point of interest on an object between the projector and the projection surface, and to determine a second point of interest on the projection surface, wherein the processing component determines the first point of interest by determining a point on the object furthest from where the object crosses a border of an image;
   a ranging apparatus to determine a first distance to the first point of interest and to determine a second distance to the second point of interest; and
   a gesture recognition component to interpret gestures as a function of the first and second distances.

30. The apparatus of claim 29 wherein the processing component determines the second point of interest as a point on the projection surface in the vicinity of the first point of interest.

31. An apparatus comprising:
   a projector to project onto a projection surface;
   an imager to capture images;
   a processing component to interpret captured images and determine a first point of interest on an object between the projector and the projection surface, and to determine a second point of interest on the projection surface;
   a ranging apparatus to determine a first distance to the first point of interest and to determine a second distance to the second point of interest; and
   a gesture recognition component to interpret gestures as a function of the first and second distances, wherein the gesture recognition component recognizes movement of the first point of interest as gestures when the difference between the first and second distances is below a threshold.

* * * * *